(12) United States Patent
Vronay

(10) Patent No.: US 7,698,335 B1
(45) Date of Patent: Apr. 13, 2010

(54) CLUSTER ORGANIZATION OF ELECTRONICALLY-STORED ITEMS

(75) Inventor: David Vronay, Beijing (CN)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 11/167,515

(22) Filed: Jun. 27, 2005

(51) Int. Cl.
*G06F 7/00* (2006.01)
*G06F 17/30* (2006.01)

(52) U.S. Cl. ...................................................... 707/737
(58) Field of Classification Search ................... 707/3–6
See application file for complete search history.

(56) References Cited

U.S. PATENT DOCUMENTS

| | | | |
|---|---|---|---|
| 6,009,442 A * | 12/1999 | Chen et al. ................... | 715/522 |
| 6,233,575 B1 * | 5/2001 | Agrawal et al. ................ | 707/6 |
| 6,592,627 B1 * | 7/2003 | Agrawal et al. ............. | 715/513 |
| 2002/0048401 A1 | 4/2002 | Boykov et al. | |
| 2002/0060650 A1 | 5/2002 | Wakashiro et al. | |
| 2005/0157926 A1 | 7/2005 | Moravec et al. | |
| 2006/0242147 A1 * | 10/2006 | Gehrking et al. ............... | 707/7 |

OTHER PUBLICATIONS

"Adobe Photoshop", Adobe System Incorporated, 1993, pp. 1-6.
Blake, et al., "Interactive Image Segmentation using an adaptive GMMRF model" In Proc. European Conf. Computer Vision 2004 pp. 1-14.
Boykov, et al., "Computing Geodesics and Minimal Surfaces via Graph Cuts" In proceedings of IEEE Intl. Conf. on Computer Vision (ICVV) Nice France Jul. 2001 vol. 1 pp. 26-33.
Boykov, et al., "Interactive Graph Cuts for Optimal Boundary & Region Segmentation of Object in N-D Images" In Proc. IEEE Int. Conf on Computer Vision Jul. 2001 vol. 1 pp. 105-112.
Caselles, "Geodesic Active Contours" In Proc. IEEE Int. Conf. on Computer Vision 22 (1) 1997 pp. 61-79.
Chuang, et al., "A Bayesian Approach to Digital Matting" In Proc. IEEE Conf. Computer Vision and Pattern Recog. 2001 8 pages.
Dempster, et al., "Maximum Likelihood from Incomplete Data via the EM Algorithm" Journal of the Royal Statistical Society Series B vol. 39 1977 pp. 1-38.
Kolmogorov, et al., "What Energy Functions can be Minimized via Graph Cuts?" In Proc. European Conf. Computer Vision 2002 pp. 1-17.
Kwatra, et al., Graphcut Textures: Image and Video Synthesis Using Graph Cuts Proce. ACM Siggraph 2003 pp. 227-286.
Mortensen, E., et al., "Intelligent Scissors for Image Composition", Pro. ACM Siggraph, 1995, pp. 191-198.

(Continued)

*Primary Examiner*—Jean B Fleurantin
*Assistant Examiner*—Aleksandr Kerzhner
(74) *Attorney, Agent, or Firm*—Lee & Hayes, PLLC

(57) ABSTRACT

Clusters are described which may be utilized to organize electronically-stored items. A variety of techniques may be employed using the clusters to organize the items. For instance, the clusters may be automatically generated and then modified by a user to classify the items as desired such that a modification made to a single item is propagated to other similar items. Therefore, the single item and the other similar items may be clustered automatically through interaction with the single item.

19 Claims, 6 Drawing Sheets

OTHER PUBLICATIONS

Mortensen, et al., "Toboggan-Based Intelligent Scissors with a Four Parameter Edge Model" In Proc. IEEE Conf. Computer Vision and Pattern Recog. 1999 vol. 2 pp. 452-458.

Ruzon, et al., "Alpha Estimation in Natural Images" In Proc. IEEE Conf. Comp. Vision and Pattern Recog. vol. 1 Jun. 2000 pp. 18-25.

* cited by examiner

US 7,698,335 B1

CLUSTER ORGANIZATION OF ELECTRONICALLY-STORED ITEMS

BACKGROUND

Users are continually exposed to ever increasing numbers of electronically stored items. For example, users may store documents, spreadsheets, photos, music, and messages electronically. However, as the number of electronically-stored items has continued to increase, so to has the difficulty in locating a particular item of interest.

Message communication, for example, has become and continues to be one of the most prevalent uses of computing devices, such as personal computers, wireless phones, and so on. For instance, users may communicate, one to another, through the use of email (i.e., electronic mail), instant messages, and so on. The amount of messages that is received by the user is ever increasing, however, and may consequently hinder the user's efficiency in dealing with each message. For example, the user may not be able to readily differentiate between these different uses of messages (e.g., work and personal), and therefore not readily navigate to particular messages of interest. Other types of electronically-stored items suffer from similar difficulties. The user, for instance, may stores thousands of songs and photos on a portable digital device and may therefore encounter difficulty in locating a particular photo or song.

SUMMARY

Clusters are described which may be utilized to organize electronically-stored items based on how the items are related, one to another. The clusters may be automatically generated and then modified by a user to classify the items as desired. For example, the electronically-stored items may be automatically categorized by a system. A user may then manually re-categorize one or more of the items and have this change automatically propagated by the system to other similar electronically-stored items such that the similar items are clustered as directed by the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

The amount of electronically-stored items (hereinafter "items"), such as messages, documents, images, and so on, is continually increasing and consequently hinders a user's ability to locate particular items of interest. In a variety of implementations, techniques are described which may be utilized to automatically organize items and further enable a user to adjust how those items are organized.

A keyword extraction technique, for instance, may be utilized to extract keywords from the items which may be indicative of the subject matter of the items. Similarity of the keywords may then be computed, such as based on the use of the keywords in the items. For example, similarity values may be computed which indicate how the keywords relate to each other. This similarity may then be utilized to cluster the keywords and items based on the clusters. Representations of the items may then be output in a user interface such that the representations reflect the clustering. Thus, a user may be presented with an automated organization of the items which may be utilized to navigate to particular items of interest.

Additionally, modifications may be made to the clusters (and more particularly items with the clusters) by the user to adjust which items are included in the clusters. For example, the user may manually re-categorize an item that was automatically placed in one cluster into another cluster, e.g., a new cluster or a different preexisting cluster. Items that are similar to the re-categorized item are then automatically placed in this cluster based on the user's interaction with the item. Thus, a user may interact and classify a single item and have each other item in the classified accordingly. Further discussion of modifications to clusters may be found in relation to FIGS. 3-6.

In the following discussion, an exemplary environment is first described which is operable to employ clustering techniques. Exemplary procedures and user interfaces are then described which are operable in the exemplary environment to provide the clustering techniques, as well as in other environments.

Exemplary Environment

Figure 1:
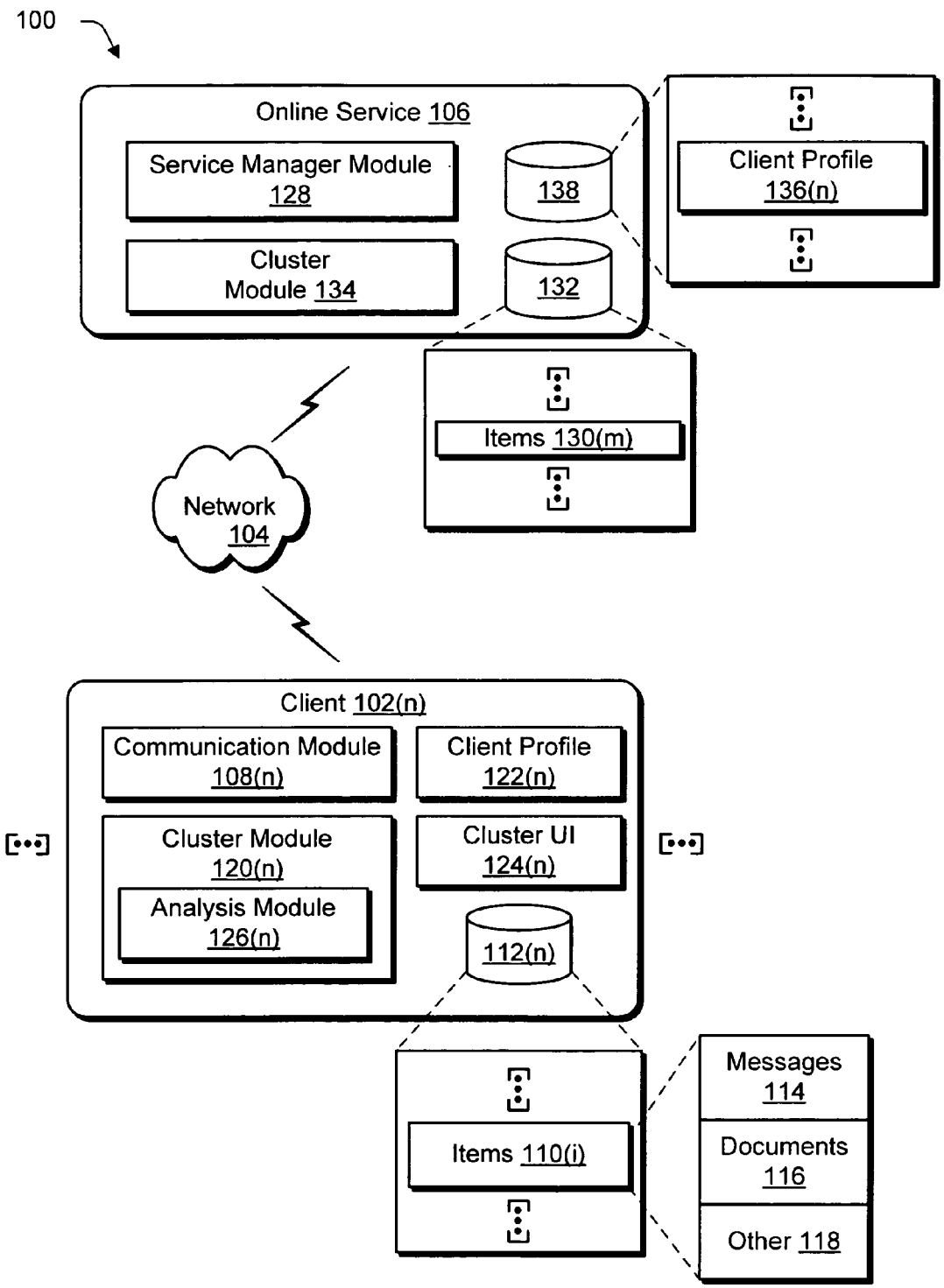
FIG. 1 is an illustration of an environment in an exemplary implementation that is operable to employ clusters.

FIG. 1 illustrates an environment 100 in an exemplary implementation that is operable to employ clusters. The environment 100 is illustrated as including a plurality of clients 102(*n*) (where "n" can be any integer form one to "N") that are communicatively coupled, one to another, over a network 104. The plurality of clients 102(*n*) may be configured in a variety of ways. For example, one or more of the clients 102(*n*) may be configured as a computer that is capable of communicating over the network 104, such as a desktop computer, a mobile station, a game console, an entertainment appliance, a set-top box communicatively coupled to a display device, a wireless phone, and so forth. The clients 102(*n*) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(*n*) may also relate to a person and/or entity that operate the client. In other words, the clients 102(*n*) may describe a logical client that includes a user and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, a collection of the plurality of clients 102(n) may be coupled via a peer-to-peer network to communicate, one to another. Each of these clients may also be communicatively coupled to an online service 106 over the Internet. A variety of other examples are also contemplated.

Each of the plurality of clients 102(n) is illustrated as including a respective one of a plurality of communication modules 108(n). In the illustrated implementation, each of the plurality of communication modules 108(n) is executable on a respective one of the plurality of clients 102(n) to send and receive messages. For example, one or more of the communication modules 108(n) may be configured to send and receive email. Email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header and a user-specified payload, such as text and attachments, e.g., documents, computer-executable files, and so on. The header contains technical information about the source and oftentimes may describe the route the message took from sender to recipient.

In another example, one or more of the communication modules 108(n) may be configured to send and receive instant messages. Instant messaging provides a mechanism such that each of the clients 102(n), when participating in an instant messaging session, may send text messages to each other. The instant messages are typically communicated in real time, although delayed delivery may also be utilized, such as by logging the text messages when one of the clients 102(n) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received. Although messages configured as instant messages and emails have been described, messages may assume a variety of other configurations without departing from the spirit and scope thereof, such as faxes, phone messages, and so on.

Each of the plurality of clients 102(n) is illustrated as having a plurality of items 110(i), where "i" can be any integer from one to "I", that is electronically stored in storage 112(n). The items 110(i) may be configured in a variety of ways. For example, one or more of the items may be configured as messages 114 (e.g., email, instant messages, voicemail, and so on), documents 116, and other 118 electronically-storable data. As previously described, the quantity of items 110(i) may become quite large. For instance, the client 102(n) may store thousands of email messages alone, as well as instant messages, documents, and so forth.

In order to organize the plurality of items 110(i), the client 102(n) may employ a cluster module 120(n). The cluster module 120(n) is executable to generate a client profile 122(n) for organization of representations of the plurality of items 110(i) in a cluster user interface (UI) 124(n). The cluster module 120(n), for example, may employ an analysis module 126(n). The analysis module 126(n) is representative of functionality that is executable to examine the plurality of items 110(i) and determine similarity of the items, one to another. For example, the analysis module 126(n) may be executed to determine similarity of items 110(i) based on keywords within the items 110(i). The items may then be arranged accordingly to the client profile 122(n) for output in the cluster UI 124(n) to reflect similarities of the items. Therefore, when a user of the client 102(n) wants to locate a specific item from the plurality of items 110(i), but does not remember a specific name, date and so on of the item, the user can navigate through clusters of items 110(i) in the cluster UI 124(n) to locate the desired item.

Although similarity based on keywords has been discussed, the analysis module 126(n) may employ a wide variety of similarity measures, such as similarity between pixels in photographs, notes in a song, metadata related to electronically-stored items, and so on. Additionally, heterogeneous items may be compared (e.g., such as emails with photographs) to determine similarities between the items and have the items clustered accordingly.

Similarity may be expressed in a wide variety of ways. For instance, a linear scale may be utilized to express similarity between each of the items 110(i), such as assign a value of "1.0" to a "perfect copy", a value of "0.9" to a "very similar" item, a value of "0.0" to an item that has "nothing in common with the item in question", and so on. In another instance, a non-linear scale may also be utilized to express similarity.

Although execution of the cluster module 120(n) on the client 102(n) has been described, the online service 106 may also employ similar functionality. For example, each of the clients 102(n) may communicate (through execution of respective communication modules 108(n)) with one another through interaction with the online service 106. The online service 106 is illustrated as including a service manager module 128 (hereinafter "manager module") that is executable to manage a variety of online services. For example, the service manager module 128 may be configured to route messages between the communication modules 108(1)-108(N). In an implementation, the online service 106 may be configured to store and route email, such as through configuration as an email provider. For instance, one of the plurality of clients 102(n) may execute a respective communication module 108(n) to form an email for communication to another one of the plurality of clients 102(n). The communication module 108(n) communicates the email to the online service 106, which is then stored as one of a plurality of items 130(m), where "m" can be any integer from one to "M", which are stored in storage 132. The other client, to retrieve the email, "logs on" to the online service 106 (e.g., by providing user identification and password) and retrieves emails from a corresponding account. In this way, the other client may retrieve corresponding emails from one or more of the plurality of clients 102(n) that are communicatively coupled to the online service 106 over the network 104.

The online service 106, through access to the plurality of items 130(m) for each of the respective clients 102(n), may also determine the similarity of each of the items 130(m) for each respective client 102(n). For example, the similarity may be determined by examining the use of keywords within the items 130(m), pixels in images, and so on. Therefore, the online service 106 may execute a cluster module 134 to generate a client profile 136(n) for each of the plurality of clients 102(n), which are illustrated as stored in storage 138. These client profiles 136(n) may then be communicated from the online service 106 to each of the respective clients 102(n) for output in a respective cluster UI 124(n). Although an online service 106 has been described that is configured to provide message communication (e.g., email, instant messages, and so on), a variety of services may be utilized to generate clusters for organization of items, such as any service that stores client data.

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the clustering techniques described below are platform-independent, meaning that the techniques may be implemented on a variety of commercial computing platforms having a variety of processors.

Figure 2:
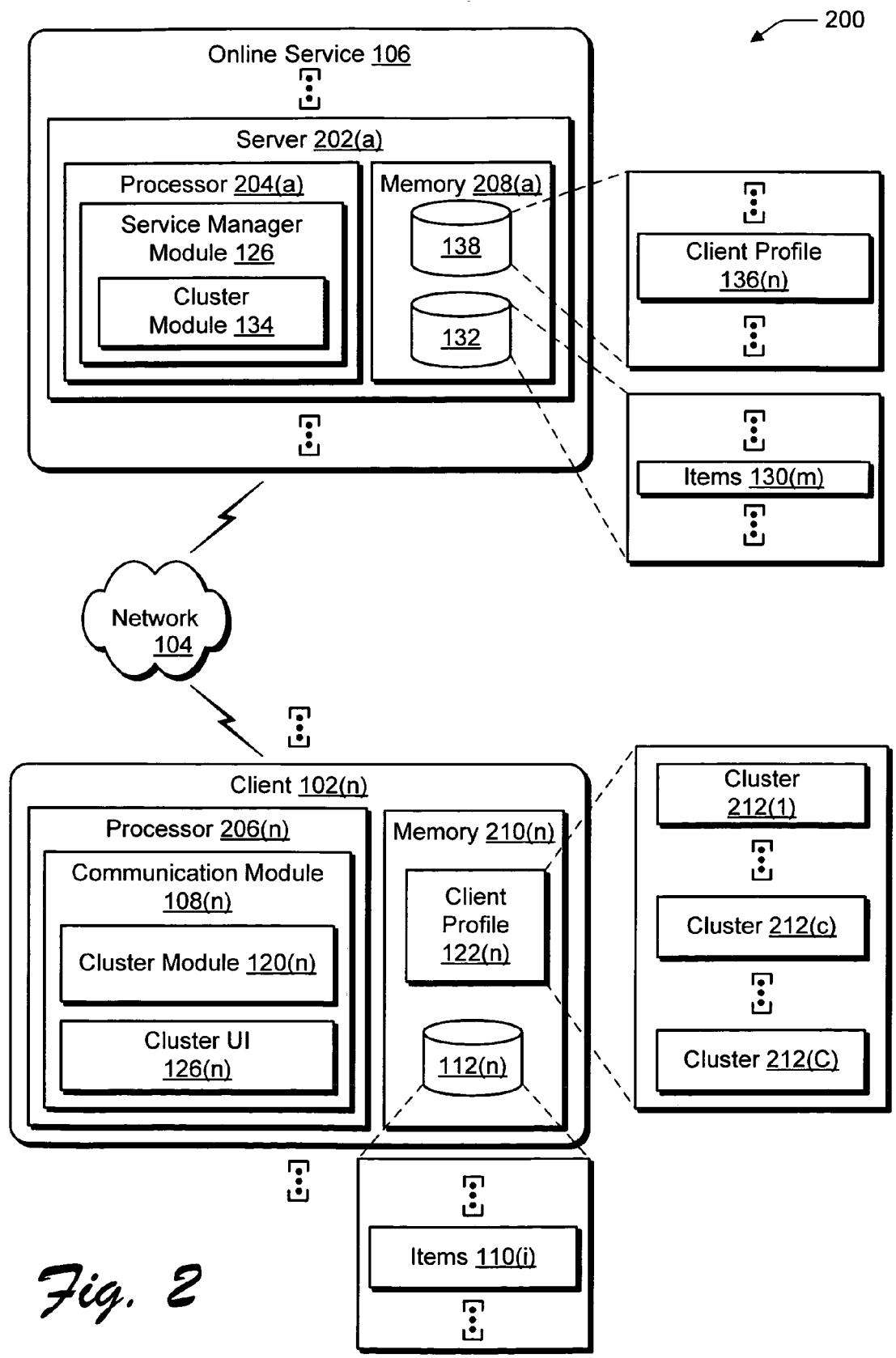
FIG. 2 is an illustration of a system in an exemplary implementation showing a plurality of clients and an online service of FIG. 1 in greater detail.

FIG. 2 is an illustration of a system 200 in an exemplary implementation showing the plurality of clients 102(n) and the online service 106 of FIG. 1 in greater detail. The online service 106 is illustrated as being implemented by a plurality of servers 202(a) (where "a" can be any integer from one to "A") and the clients 102(n) are illustrated as client devices. The servers 202(a) and the clients 102(n) are each illustrated as having respective processors 204(a), 206(n) and respective memories 208(a), 210(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(a), 210(n) is shown, respectively, for the servers 202(a) and the clients 102(n), a wide variety of types and combinations of memory may be employed, such as random access memory (RAM), hard disk memory, removable medium memory, and so forth. For example, the client profile 122(n) may be stored in RAM and the storage 112(n) for the plurality of items 110(i) may be implemented by one or more hard disk drives.

The cluster module 120(n) and the cluster UI 126(n) are illustrated in FIG. 2 as included within the communication module 108(n) to indicate that the communication module may employ this functionality. The cluster module 120(n), when executed, may calculate similarity of each of the plurality of items 110(i) stored on the client 102(n) to define a context for the items 110(i). The cluster module 120(n) may then create clusters of the keywords based on the similarity of the items 110(i), one to another.

For example, a plurality of keywords generated by the cluster module 120(n) through analysis of the plurality of items 110(i) may be arranged in one or more of a plurality of clusters 212(1), ..., 212(c), ..., 212(C) based on the client profile 122(n). This analysis may be performed in a variety of ways. For example, the cluster module 120(n) may examine each of the plurality of items 110(i) to extract the keywords. The cluster module 120(n) may then determine a similarity of each of the plurality of items 110(i), one to another, based on the relationship of the keywords to the items. These similarities may be utilized to form clusters 212(1)-212(C) to organize the plurality of items 110(i).

The cluster UI 126(n) may then display representations of the plurality of items 110(i) arranged accordingly to the client profile 122(n) into the plurality of clusters 212(1)-212(C). The cluster UI 126(n) may be configured in a variety of ways to display the items 110(i), an example of which may be found in relation to FIG. 3.

The cluster UI 126(n) may also be configured to accept inputs from a user to adjust membership of items 110(i) within the clusters. For example, the user may manually specify membership of individual items 110(i) in the client profile 122(n). Whenever membership is specified, the cluster module 120(n) may propagate this modification to each of the other items 110(i) in the clusters 212(1)-212(C), further discussion of which may be found in relation to FIGS. 4 and 6. Thus, the cluster UI 126(n) provides a technique for the client 102(n) to navigate through a large number of items using a minimal number of user interface actions.

Figure 3:
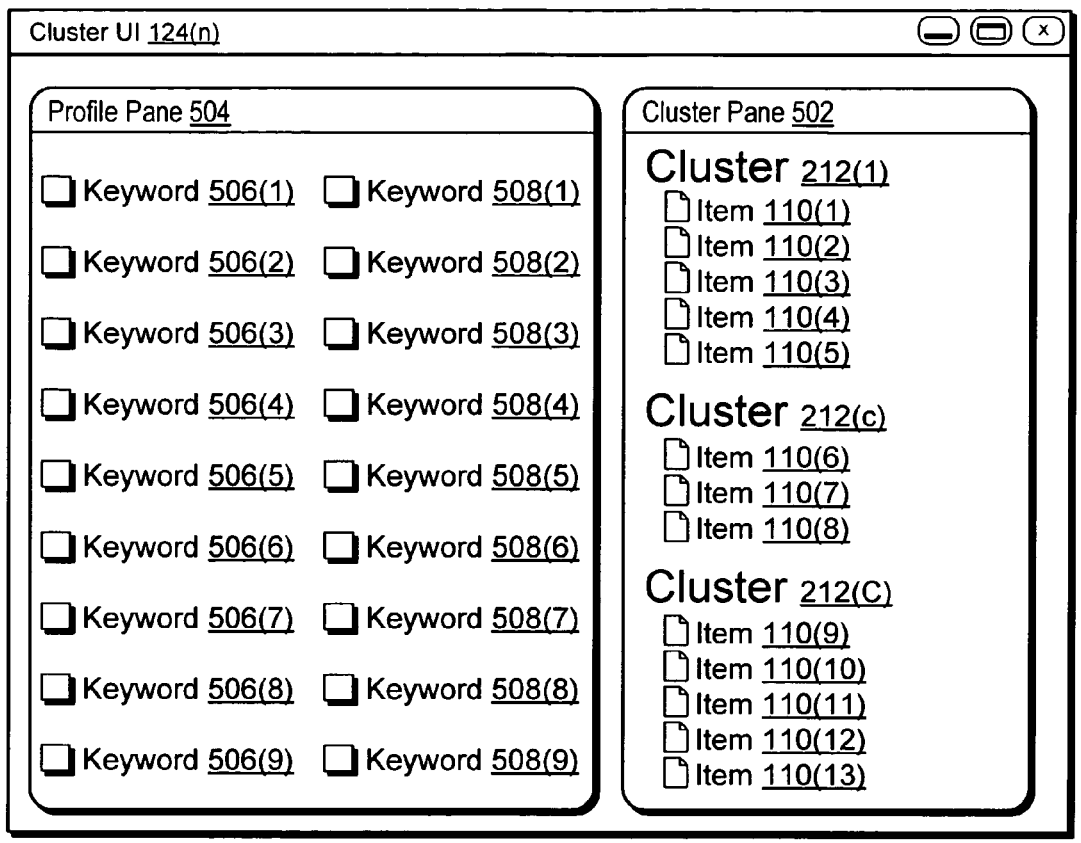
FIG. 3 is an illustration in an exemplary implementation showing an example of a cluster user interface of FIGS. 1 and 2.

FIG. 3 is an illustration in an exemplary implementation showing an example 300 of the cluster UI 124(n) of FIGS. 1 and 2. The cluster UI 124(n) is illustrated as having two portions, a cluster pane 502 and a profile pane 504. The cluster pane 502 includes a plurality of representations of items 110(1)-110(13) arranged into corresponding clusters 212(1), 212(c), 212(C).

To modify membership of the plurality of items 110(1)-110(13) in the clusters 212(1)-212(C), a user may interact with the profile pane 504 of the cluster UI 124(n). The profile pane 504 in this instance includes a plurality of keywords 506(1)-506(9), 508(1)-508(9) that specify relationships of items within the clusters. Specification of the keywords may be performed initially by the cluster module 120(n), and more particularly the analysis module 126(n). The user may then manually interact with the profile pane 504 to adjust this automatic clustering using the check boxes. The cluster module 120(n) may then re-cluster the items based on the modification and this process may be repeated to enable the user to navigate (e.g., sort) through the items. Further, the cluster module 120(n) may extend the modification to similar keywords and monitor user interaction with the keywords to further cluster the items, further discussion of which may be found in relation to the following procedures.

Exemplary Procedures

The following discussion describes clustering techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2 and the user interface 300 of FIG. 3.

Figure 4:
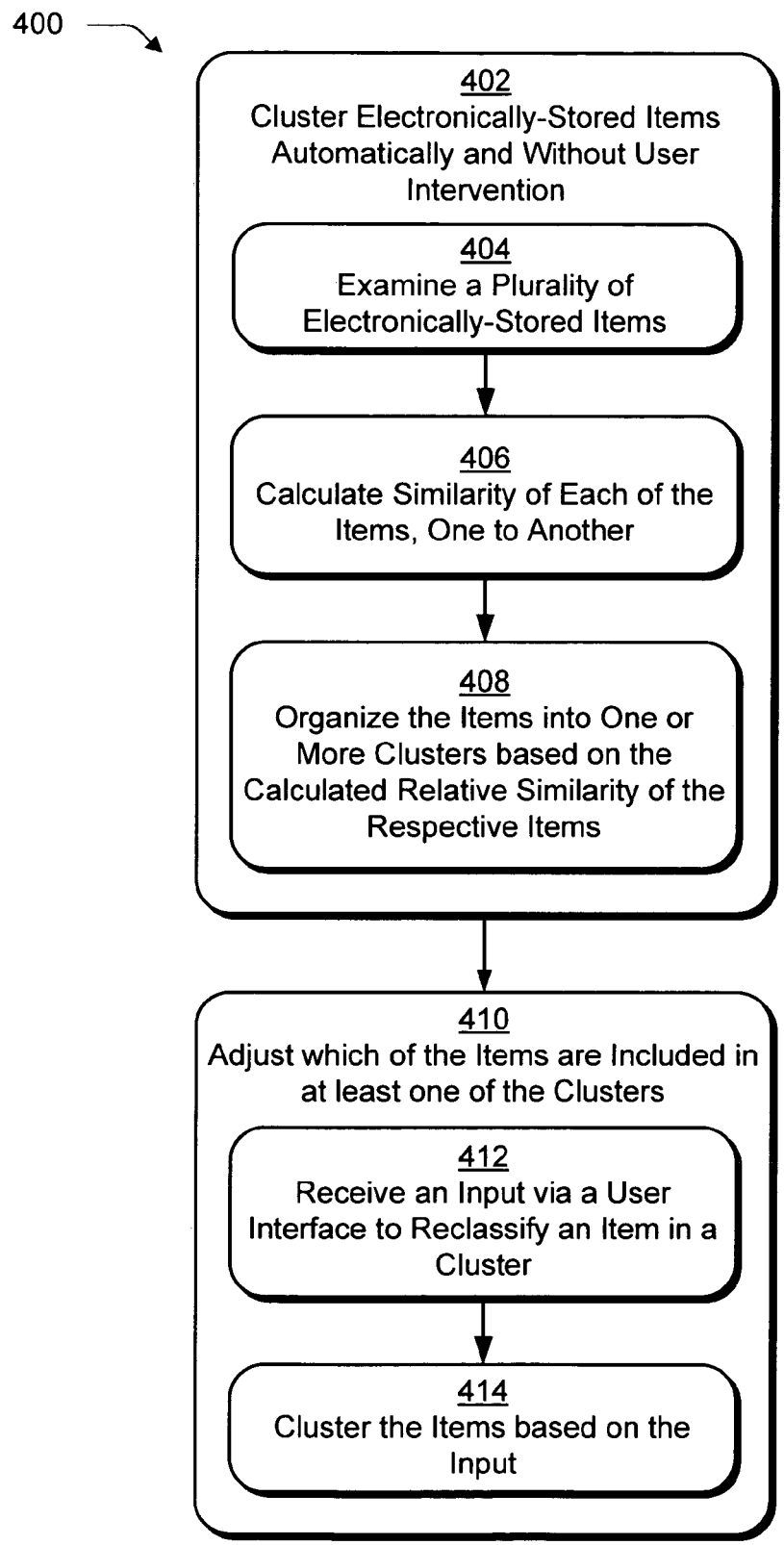
FIG. 4 is a flow diagram depicting a procedure in an exemplary implementation in which membership of items within a cluster that was automatically generated is adjusted by a user via a user interface.

FIG. 4 depicts a procedure 400 in an exemplary implementation in which membership of items within an automatically generated cluster is adjusted by a user via a user interface. Electronically-stored items are clustered automatically and without user intervention (block 402). As previously described, electronically-stored items may be configured in a variety of ways, such as email, instant messages, documents, spreadsheets, faxes, phone messages, contacts, images, songs, videos, and so on.

To cluster the items, each of the plurality of electronically-stored items are examined (block 404). For example, the analysis module 126(n) may be executed to note occurrences of keywords in the items. In another example, the analysis module 126(*n*) examines pixels included in images. A variety of other examples are also contemplated. It should be noted that the items may be the same as or different from the items that are being clustered. For example, the items may include a subset of locally stored items 110(*i*) that are available on the client 104(*n*) which are utilized to cluster a later set of items. In another example, the items that are examined and the items that are clustered are the same.

Similarity of each of the items, one to another, is calculated (block 406). For example, occurrences of the keywords within a document and/or placement of the keywords in relation to other keywords may be utilized to determine similarity values. Thus, the similarity values may describe how the items relate to each other.

The items are organized into one or more clusters based on the calculated similarities of the respective items (block 408). For example, the cluster module 120(*n*) may cluster the items based on the similarity values as related to a specified threshold. For instance, the threshold may indicate a minimum amount of similarity that is to be demonstrated by items in a common cluster. The cluster module 120(*n*) may then cluster the items to reflect that the items in the cluster have at least this threshold amount of similarity.

An adjustment may then be made as to which of the items are included in at least one of the clusters (block 410). An input, for instance, may be received via a user interface to reclassify an item in a cluster (block 412). For example, the user may interact with a user interface and reclassify an item that was placed in a first cluster into another cluster. The input may then be utilized by the analysis module 126(*n*) to determine which other items are to be included in the other cluster based on the similarity of the other items to the reclassified item. The items are then clustered based on the input (block 414). Thus, the user's interaction with a single item may be utilized to automatically re-categorize a vast number of additional items.

For example, a user may start by sorting keywords into "public" and "private" clusters. The user may start by adding "lawyer" to "private" such that private details of the user are not shared with other users. The cluster module may then automatically make related keywords private, such as "divorce", "custody", and so on. However, the user may desire one or more of the related keywords to be kept as public, such as "law articles". Therefore, the user can move the keyword "law articles" back into the "public" space and keywords similar to "law articles" (e.g., "law review") moved automatically to the "public" cluster, while the other keywords (e.g., "divorce") remain in the "private" cluster. Further discussion of extension of a keyword to cluster similar items may be found in relation to the following figure.

Figure 5:
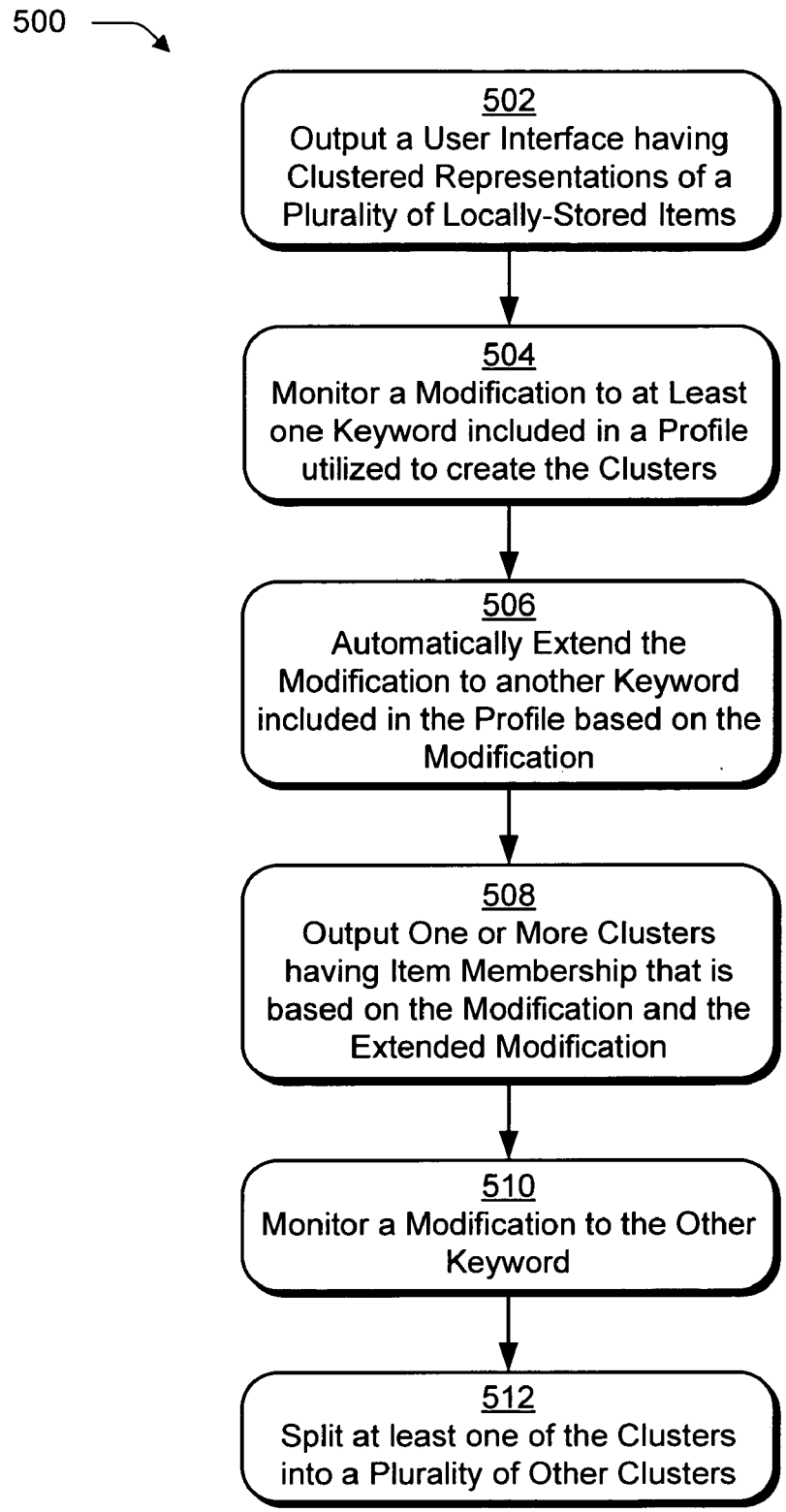
FIG. 5 is a flow diagram depicting a procedure in an exemplary implementation in which selection of a keyword is automatically extended to another keyword.

FIG. 5 is a flow diagram depicting a procedure 500 in an exemplary implementation in which selection of a keyword is automatically extended to another keyword. A user interface is output having clustered representations of a plurality of items (block 502). For example, the items 110(*i*) may be locally stored on a client 102(*n*) which outputs the user interface. In another example, the items 130(*m*) are stored remotely over a network 104 by an online service 106, such as an email provider, instant messaging service, image storage service, music lockbox, and so on.

A modification is monitored, the modification made to at least one keyword included in a profile utilized to create the clusters (block 504). For example, a user may interact with a cluster user interface and select an additional keyword and/or deselect a keyword utilized to generate the clusters.

The modification is automatically extended to another keyword included in the profile based on the modification (block 506). For instance, closeness values may indicate that the keyword that was deselected is closely related to another keyword, such as "football" to "quarterback" and "touchdown". Therefore, the cluster module 120(*n*), upon receipt of an input to uncheck the keyword "football" may also automatically uncheck the keywords "quarterback" and "touchdown" in the user interface. Thus, the user may be informed that these additional keywords are not being used as criteria to cluster the items.

One or more clusters are then output having item membership that is based on the modification and the extended modification (block 508). For example, the profile having the modification (e.g., deselecting the keyword) and the extended modification (e.g., deselecting the additional keyword) may then be utilized to re-cluster representations of the plurality of items.

Monitoring is again performed, but in this instance also particularly notes modifications to the other keyword (block 510). In other words, interaction with keywords that were automatically added is specially noted by the cluster module 102(*n*). Continuing with the previous example, the user may select the keyword "quarterback" but leave the keywords "football" and "touchdown" as not selected. Because the keyword "quarterback" was deselected by the cluster module 120(*n*), and not the user, the module may take appropriate action. For instance, the cluster module 120(*n*) may split the cluster into a plurality of other clusters, at least one of which employs the modification. For instance, a new cluster may be formed for the keywords "football" and "touchdown" and another cluster may be formed for the keyword "quarterback". Thus, when a cluster contains both wanted and unwanted keywords, the cluster may be split into a plurality of other clusters (block 512).

Figure 6:
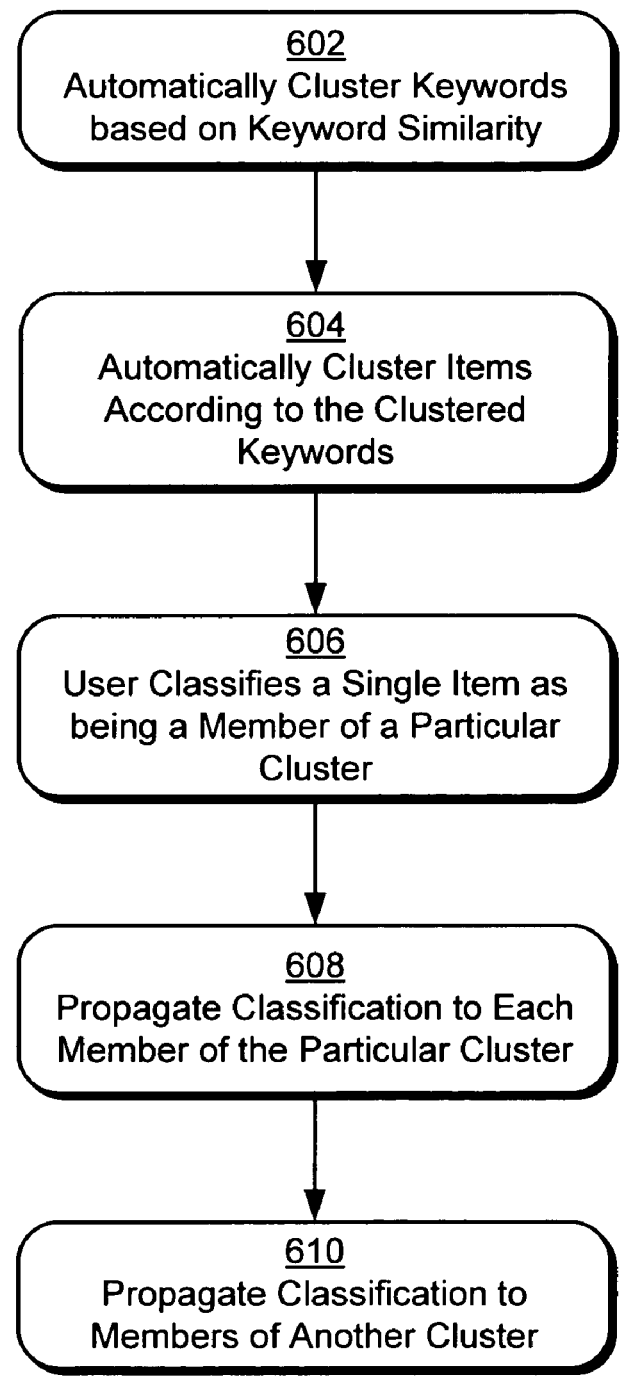
FIG. 6 is a flow diagram depicting a procedure in an exemplary implementation in which a classification made to a single item to a cluster is propagated to each item in the cluster.

FIG. 6 depicts a procedure in an exemplary implementation in which a classification made to a single item to a cluster is propagated in each item in the cluster. Keywords are automatically clustered based on keyword similarity (block 602). For example, the keywords may be clustered based on how the keywords are typically used, such as based on a training text, items that correspond to a particular user, and so on. Items are then automatically clustered according to the clustered keywords (block 604). For example, each of the items may be clustered according to which keywords relate to the respective items. Thus, a user may be provided with an automatically generated display of items that are organized based on which keywords relate to the items.

A user classifies a single item as being a member of a particular cluster (block 606). That classification is then propagated to each member of the particular cluster (block 608). Thus, as previously described in relation to FIG. 4, the user in this instance may interact with a single item and have a result of that interaction applied to each item in the cluster. The classification may also be propagated to members of another cluster (block 610). For instance, when the user unchecks a keyword, clusters with similar keywords may also automatically uncheck the keyword. Although use of keywords has been described in relation to FIG. 6, additional techniques may also be utilized to determine similarity as previously described.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:

storing, by an online-service device configured to provide cluster functionality of electronically-stored items, a plurality of electronically-stored items from each of a plurality of clients, wherein the online service application is located at a server;

automatically clustering, by the online-service device, for each client, a plurality of electronically-stored items into corresponding item clusters based on relative similarity of each said item, one to another, without user input;

generating, by the online-service device, for each client, a client profile for organization of representations of the clustered items;

storing, by the online-service device, the client profile at the server;

communicating, by the online-service device, the client profile to a first client for output via a user interface of the first client;

receiving, by the online-service device, via the user interface, a user-submitted request submitted by the first client, the request indicating:

a first item that is in a first item cluster; and a second item cluster to which the first item is to be assigned;

in response to the user-submitted request:

moving the first item from the first item cluster to the second item cluster;

without further input from the user:

identifying, by the online-service device, one or more other items to be reassigned to a different cluster, based on similarity between the first item and the other items; and reassigning, by the online-service device, the one or more other items to the different cluster.

2. A method as described in claim 1, wherein the clustering is performed automatically and without user intervention.

3. A method as described in claim 1, wherein the one or more items are clustered based on relative similarity of each of the items, one to another, based on use of keywords extracted from the items.

4. A method as described in claim 1, wherein:

one or more said item clusters are formed based on keywords; and the identifying, by the online-service device, one or more other items to be reassigned to a different cluster, based on similarity between the first item and the other items comprises:

identifying, by the online-service device, a first keyword associated with the first item;

identifying, by the online-service device, a second keyword that is similar to the first keyword; and identifying, by the online-service device, the one or more other items based on the second keyword being associated with each of the one or more other items.

5. A method as described in claim 1, wherein one or more said item clusters are formed based on keywords and wherein the reassigning the one or more other items to the different cluster comprises:

creating, by the online-service device, a third cluster, separate from the first and second clusters, wherein the third cluster is based, at least in part, on the second keyword; and assigning, by the online-service device, the one or more other items to the third cluster.

6. A method as described in claim 1, wherein clustering the plurality of electronically-stored items into corresponding item clusters comprises:

analyzing, by the online-service device, a plurality of items to define a plurality of cluster profiles;

analyzing, by the online-service device, the plurality of electronically-stored items to determine, for each of the electronically-stored items, a particular one of the cluster profiles; and clustering, by the online-service device, the plurality of electronically-stored items based on the cluster profiles.

7. A method as described in claim 6, wherein the plurality of items that are analyzed to define the plurality of cluster profiles comprises at least one of the plurality of electronically-stored items.

8. A method as described in claim 6, wherein the plurality of items that are analyzed to define the plurality of cluster profiles does not include any of the plurality of electronically-stored items.

9. A method as described in claim 1, wherein reassigning the one or more other items to the different cluster comprises performing a reclustering operation selected from a group of reclustering operations comprising:

removing an item from the first cluster;

adding an item to the first cluster;

removing an item from the second cluster; and adding an item to the second cluster.

10. A method as described in claim 1, wherein the item clusters comprises:

a public cluster, the items of which are shared with other users; and a private cluster, the items of which cannot be searched, accessed, or shared by other users.

11. A method as described in claim 1, wherein: the relative similarity is expressed as a numerical value;

a threshold value indicates a minimum amount of similarity that is to be demonstrated by items in a particular item cluster.

12. A system comprising:

a processor;

a memory;

an online-service module maintained by the memory and executed by the processor, the online-service module configured to:

provide cluster functionality of electronically-stored items, a plurality of electronically-stored items from each of a plurality of clients, wherein the online service application is located at a server;

for each client, automatically cluster a plurality of electronically-stored items into corresponding item clusters based on relative similarity of each said item, one to another, without user input;

for each client, generate a client profile for organization of representations of the clustered items;

store the client profile at the server;

communicate the client profile to a first client for output via a user interface of the first client;

a cluster user interface module maintained by the memory and executed by the processor, the cluster user interface module configured to:

present representations of the clusters via a display device; and receive a user-submitted cluster modification, the user-submitted cluster modification comprising a modification to a first keyword in a keyword profile associated with a particular cluster;

an analysis module configured to:
identify attributes of the user-submitted cluster modification; and
extend the user-submitted cluster modification by performing a non-requested cluster modification, wherein the non-requested cluster modification is determined to have attributes that are similar to the attributes of the user-submitted cluster modification, the non-requested cluster modification comprising a modification to a second keyword in the keyword profile associated with the particular cluster.

13. A method as described in claim 12, wherein:
the modification to the first keyword comprises adding the first keyword to the keyword profile associated with the particular cluster; and
the modification to the second keyword comprises adding the second keyword to the keyword profile based on a similarity between the first and second keywords.

14. A method as described in claim 12, wherein:
the modification to the first keyword comprises removing the first keyword from the keyword profile associated with the particular cluster; and
the modification to the second keyword comprises removing the second keyword from the keyword profile based on a similarity between the first and second keywords.

15. A method as described in claim 14, wherein removing the second keyword from the keyword profile comprises creating a new keyword profile for a new cluster, the new keyword profile comprising the second keyword.

16. One or more computer-readable media comprising computer executable instructions that, when executed, cause a computer to perform a method, the method comprising:
storing, by an online-service device configured to provide grouping functionality of electronically-stored items, a plurality of electronically-stored items from each of a plurality of clients, wherein the online service application is located at a server;
automatically grouping, by the online-service device, for each client a plurality of keywords extracted from the plurality of electronically-stored items based on relative similarity of each said keyword, one to another, calculated from use of the keywords in the items, into a keyword profile, without user input;
generating, by the online-service device, for each client, a client profile for organization of representations of the keywords;
storing, by the online-service device, the client profile at the server;
communicating, by the online-service device, the client profile to a first client for output via a user interface of the first client;
outputting representations of electronically-stored items that reflect the keyword profiling;
outputting a user interface configured to accept modifications to the keyword profiling;
receiving, by the online-service device, via the user interface, a user-submitted indication submitted by the first client, of a first keyword to be removed from a first keyword profile;
in response to the user-submitted indication, removing, by the online-service device, the first keyword from the first keyword profile;
without further user input, dynamically applying, by the online-service device, a modification to the keyword profiling by removing a second keyword from the first keyword profile based on similarities between the first and second keywords, wherein the first and second keywords are not the same keyword; and
outputting, by the online-service device, updated representations of the electronically-stored items that reflect the modification to the keyword profiling.

17. One or more computer-readable media as described in claim 16, the method further comprising:
creating a new keyword profile, different from the first keyword profile, that comprises the first and second keywords.

18. One or more computer-readable media as described in claim 16, the method further comprising:
receiving, via the user interface, a user-submitted indication of a third keyword, that is part of a second keyword profile, to be moved from the second keyword profile to the first keyword profile;
in response to the user-submitted indication:
removing the third keyword from the second keyword profile; and
adding the third keyword to the first keyword profile;
without further user input, dynamically applying a modification to the keyword profiling by:
identifying a fourth keyword that is similar to the third keyword;
removing the fourth keyword from a keyword profile currently including the fourth keyword; and
adding the fourth keyword to the first keyword profile,
wherein:
the first and second keyword profile are not the same keyword profile; and
the third keyword and the fourth keyword are not the same keyword.

19. One or more computer-readable media as described in claim 18, wherein the user-submitted indication of the keywords is performed through use of check boxes included in the user interface that correspond to respective said keywords.

* * * * *